Patented Nov. 5, 1935

2,019,933

UNITED STATES PATENT OFFICE 2,019,933

RICINOLEATE MEDICAMENT FOR INTERNAL USE

Theodore H. Rider, Cincinnati, Ohio, assignor to The Wm. S. Merrell Company, Cincinnati, Ohio, a corporation of Ohio, No Drawing. Application October 30, 1933, Serial No. 695,846

6 Claims. (Cl. 167—68)

The present invention relates to a therapeutic substance and has for an object the provision of means to establish a method of producing intestinal detoxification without objectionable taste and stomach irritation.

These and other objects are obtained by the hereinafter described means.

It is known that sodium ricinoleate, when administered orally, exerts a detoxifying action in the various portions of the intestine and prevents reactions resulting from the absorption of toxic materials of bacterial and other origin. Oral administration of sodium ricinoleate has two highly undesirable features, namely, the objectionable taste and the irritating action in the stomach. The administration of the water soluble sodium ricinoleate therefore while having the proven beneficial properties is nevertheless an undesirable method of intestinal detoxification unless contact of the sodium ricinoleate with the mouth or stomach is prevented.

The invention consists in providing a means whereby the beneficial action of sodium ricinoleate is attained at the desired place, namely, in the intestine, although the substance administered is not sodium ricinoleate.

It has been proven that the water insoluble salts of ricinoleic acid do not have the objectionable taste. This is specifically true of calcium and magnesium ricinoleate in suspension in a neutral solution. Acids are found to liberate ricinoleic acid from calcium and magnesium ricinoleates regenerating an objectionable taste and a compound which is irritating to the stomach. It has also been found that dilute alkalis dissolve a portion of the calcium and magnesium ricinoleates, yielding sodium ricinoleate. Thus the mixing of milk of magnesia with a solution of sodium ricinoleate fails to completely precipitate the ricinoleate. Conversely, the calcium or magnesium ricinoleates if introduced into an alkaline medium, viz., the intestine, liberate sodium ricinoleate. Therefore the insoluble salts of ricinoleic acid, particularly the calcium and magnesium salts thereof are suitable as detoxifying agents for the intestine or for any condition where a slight alkalinity exists. These salts may be taken orally either as suspensions in fluids, or in capsules or emulsions. When the salts are taken without media to protect them from stomach acidity, they should be washed through rapidly. The protection is advisable for comfort but is not required to maintain therapeutic activity.

The magnesium and calcium ricinoleates, in common with other heavy metal ricinoleates, may be made by a variety of reactions, the art of which is relatively well known. For the purposes of this invention, it is preferable to prepare these salts from a purified ricinoleic acid or from derivatives thereof. It is known that ricinoleic acid may be reacted with calcium or magnesium hydroxide. It is also possible to prepare these salts by double decomposition of water soluble calcium or magnesium salts and sodium ricinoleate. The invention herein is not to be considered limited to any specific method or methods of preparing the salts or to any specific method or methods of therapeutic use but rather to the provision of water insoluble salts, especially calcium and magnesium, for attaining the beneficial detoxification of sodium ricinoleate. An effective product for the purposes stated may be made according to the following illustration, it being understood that the quantities of the ingredients are subject to variation within wide limits. One thousand (1000) pounds of colloidal kaolin or any similar insoluble, inert, colloidal solid are suspended in water and one hundred (100) pounds of ricinoleic acid is added and thoroughly mixed. A slight excess over the theoretical amount of magnesium (or calcium) hydrate is then stirred in vigorously. The magnesium ricinoleate prepared in this way remains very finely divided and the resulting suspension may be used as such if desired. The suspension prepared in this way is furthermore capable of being emulsified with mineral oil with any of the customary emulsifying agents.

The medicinal products prepared in the manner outline by the formation of calcium or magnesium ricinoleate in the presence of colloidal kaolin especially after emulsification with mineral oil can be taken into the stomach with impunity since the emulsion is not broken by admixture with dilute acid such as found in the stomach, and since the acid of the stomach will not produce such liberation of sodium ricinoleate as to produce stomach irritation.

What is claimed is:

1. A therapeutic compound for oral administration for intestinal detoxification comprising a water insoluble salt from the group consisting of calcium ricinoleate and magnesium ricinoleate.

2. A medicament for oral administration for intestinal detoxification comprising an insoluble ricinoleate from the group consisting of calcium ricinoleate and magnesium ricinoleate in a state of fine division in suspension with a solid inert colloid in suspension.

3. A therapeutic agent for oral administration for intestinal detoxification comprising calcium ricinoleate.

4. A therapeutic agent for oral administration for intestinal detoxification comprising magnesium ricinoleate.

5. A therapeutic compound for oral administration for producing intestinal detoxification comprising a water insoluble salt of ricinoleate acid selected from the group consisting of calcium ricinoleate and magnesium ricinoleate in suspension in a neutral colloidal solution.

6. The method of preparing a medication comprising a water insoluble salt selected from the group consisting of the calcium and magnesium salts of ricinoleic acid which consists in preparing and maintaining said salts in a state of fine division through the reaction of the hydrate of the cation with ricinoleic acid in the presence of a suspension of an insoluble inert solid in a colloidal state.

THEODORE H. RIDER.